US009327556B2

(12) United States Patent
Takahashi et al.

(10) Patent No.: US 9,327,556 B2
(45) Date of Patent: May 3, 2016

(54) PNEUMATIC TIRE

(75) Inventors: Fumio Takahashi, Kodaira (JP); Seiji Ishikawa, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1545 days.

(21) Appl. No.: 12/295,425

(22) PCT Filed: Mar. 30, 2007

(86) PCT No.: PCT/JP2007/057260
§ 371 (c)(1),
(2), (4) Date: Dec. 31, 2008

(87) PCT Pub. No.: WO2007/114383
PCT Pub. Date: Oct. 11, 2007

(65) Prior Publication Data
US 2009/0165909 A1    Jul. 2, 2009

(30) Foreign Application Priority Data
Mar. 31, 2006    (JP) .................................. 2006-098317

(51) Int. Cl.
*B60C 11/04*    (2006.01)
*B60C 11/03*    (2006.01)

(52) U.S. Cl.
CPC ......... *B60C 11/0306* (2013.04); *B60C 11/0318* (2013.04); *B60C 11/04* (2013.01); *B60C 11/0332* (2013.04)

(58) Field of Classification Search
CPC ............................ B60C 11/04; B60C 11/0332
USPC ............. 152/209.18, 209.19, 209.22, 209.28, 152/900, 901
See application file for complete search history.

(56) References Cited

U.S. PATENT DOCUMENTS 2,261,025 A  *  10/1941   Havens .................... 152/209.18
2,272,879 A  *   2/1942   Hargraves ............... 152/209.22
(Continued)

FOREIGN PATENT DOCUMENTS

EP    1 216 853 A2    6/2002
EP    1 637 356 A1    3/2006
(Continued)

OTHER PUBLICATIONS

Machine translation for Japan 11-334317 (no date).*
(Continued)

*Primary Examiner* — Steven D Maki
(74) *Attorney, Agent, or Firm* — Sughrue Mion, PLLC

(57) ABSTRACT

In a pneumatic tire provided on a groove surface with at least one main groove continuously extending in the circumferential direction of the tire, the air column resonance noise is effectively reduced without reducing the volume of the main groove, and the design flexibility is enhanced in consideration of the entire property of the tire. A pneumatic tire of the present invention is provided on a tread surface 1 with a main groove 2 continuously extending in the circumferential direction of the tire and a sub groove 4 having two ends open to the common main groove 2 and a portion between the ends deviously extending in a common land portion, and characterized in that the sub groove 4 is configured to extend to be entirely included in a ground contact area of the tread when the tire mounted to an applicable rim is inflated with the maximum air pressure and is postured to be applied by a load corresponding to 80% of a defined mass.

10 Claims, 6 Drawing Sheets

(56) References Cited

U.S. PATENT DOCUMENTS

2005/0076985 A1* 4/2005 Colombo et al. ........ 152/209.18
2007/0051448 A1* 3/2007 Yumii ...................... 152/209.18

FOREIGN PATENT DOCUMENTS

| | | | |
|---|---|---|---|
| JP | 61-54928 | A | 3/1986 |
| JP | 61-60306 | A | 3/1986 |
| JP | 4-163214 | A | 6/1992 |
| JP | 04-163214 | A * | 6/1992 |
| JP | 05-338411 | A | 12/1993 |
| JP | 06-143924 | A * | 5/1994 |
| JP | 07-076203 | A * | 3/1995 |
| JP | 7-76203 | A | 3/1995 |
| JP | 11-334317 | A * | 12/1999 |
| JP | 2001-191734 | A | 7/2001 |
| JP | 2002-187411 | A | 7/2002 |
| JP | 2003-63212 | A | 3/2003 |
| JP | 2004-523422 | A | 8/2004 |
| JP | 2002-293109 | A | 10/2009 |
| WO | WO-95/18022 | A1 * | 7/1995 |
| WO | 02/057617 | A1 | 7/2002 |
| WO | 2004/103737 | A1 | 12/2004 |
| WO | WO-2004/103737 | A1 * | 12/2004 |
| WO | 2005/032855 | A1 | 4/2005 |

OTHER PUBLICATIONS

Machine translation for Japan 07-076203 (no date).*
Machine translation for Japan 04-163214 (no date).*
Machine translation for Japan 06-143924 (no date).*
Translation for Japan 04-163214 (no date).*
Supplementary Europran Search Report dated Oct. 29, 2009 (6 pages).
Japanese Office Action issued in Japanese Application No. 2008-508683 dated Sep. 11, 2012.

* cited by examiner (a)

(b)

(a)

(b)

US 9,327,556 B2

PNEUMATIC TIRE

TECHNICAL FIELD

The present invention relates to a pneumatic tire having at least one main groove which is provided on a tread and continuously extends in the circumferential direction of the tire, and aims at to reduce so-called air column resonance noise produced by the main groove of a pneumatic tire.

RELATED ART

In a pneumatic tire having a main groove which is provided on a tread and continuously extends in the circumferential direction of the tire, a tube is formed on the tread, which is defined by the main groove and road surface and is open to a leading end edge and a trailing end edge. The air in the tube resonates to produce sound or air column resonance noise when the tire is rolling under load. The air column resonance noise is usually observed at frequencies within a range on the order of 800 to 1200 Hz in a general passenger vehicle, and becomes a major factor in generation of the direct sound caused by the tire due to the peak height and the broad band width of its frequency. Because human audition is especially sensitive to the above described frequency band as shown by A-weighting, the reduction of air column resonance noise is desired from the viewpoint to enhance the silence of feeling aspect.

In the prior art, the sound pressure level of air column resonance noise has been generally restrained by reducing the groove volume of a main groove. However, there is a problem that the reduction of groove volume of a main groove is accompanied by a reduction of drainage capability.

Japanese Patent Laid-Open No. 5-338411 and Japanese Patent Laid-Open No. 2001-0191734 describe a tire in which Helmholtz resonators are provided at a groove wall of a main groove so as to reduce sound pressure level.

Also, the applicant of the present invention proposed a technology for reducing resonance noise of a tire using anti-resonance of side tube, in which a lateral groove that is open to a main groove at one end thereof and terminates in a land portion at the other end thereof is formed without intersecting with other grooves and is made longer than a conventional lateral groove (see WO 2004/103737).

DISCLOSURE OF THE INVENTION

In many cases, however, it is difficult to design a tire having Helmholtz resonators like those described in Japanese Patent Laid-Open No. 5-338411 and Japanese Patent Laid-Open No. 2001-0191734 in an actual tread pattern of the tire. In addition, the above Patent Documents do not sufficiently disclose a method for specifically and effectively arranging the resonators in a tread pattern in consideration of the entire property of a tire. Moreover, the arrangement of a lateral groove described in WO 2004/103737 may be difficult from the viewpoint of the design flexibility of tread pattern and the maintaining of appropriate pattern stiffness.

The present invention is directed to solve these problems in the prior art, and one object of the present invention is to provide a pneumatic tire which effectively reduces air column resonance noise without reducing the volume of a main groove extending in the circumferential direction of the tire, and has a high design flexibility in consideration of the entire property of the tire.

In order to achieve the above object, the present invention provides a pneumatic tire which is provided on a tread surface with at least one main groove continuously extending in the circumferential direction of the tire and at least one sub groove having two ends open to the common main groove and the portion between the ends deviously extending in a common land portion, with the sub groove being configured to extend to be entirely included in a ground contact area of the tread when the tire mounted to an applicable rim is inflated with the maximum air pressure and is postured to be applied by a load corresponding to 80% of a defined mass. The configuration allows the sub groove to function as an interference silencer against the air column resonance noise produced by the main groove, thereby the sound pressure level of the air column resonance noise can be restrained without reducing the volume of the main groove. In addition, because there is little limitation on the configuration to extend the sub groove, the design flexibility of a tread pattern in consideration of the entire property of the tire can be enhanced.

The main groove "continuously extending in the circumferential direction of a tire" as used herein includes not only a groove which linearly extends along the circumferential direction of a tire but also a so-called devious groove which extends in a wavy or zigzag shape and generally extends in the circumferential direction of the tire. The phrase "ends open to the common main groove and the portion between the ends deviously extending in a common land portion" means that only the ends are open to a groove and the remaining portion is not open to a main groove or other groove. Moreover, the terms "applicable rim", "maximum air pressure", and "maximum loading capability" mean the applicable rim, the maximum air pressure, and the maximum loading capability, respectively, which are defined by industry standards, regulations, and the like which are effective in the region where the tire is manufactured, sold, or used, such as JATMA, TRA, and ETRTO. Furthermore, the "configuration to extend to be entirely included in a tread ground contact area" means the configuration of a groove which does not have a portion located outside of a tread ground contact area and is entirely included in the tread ground contact area when the tire in the above posture is rolling under load.

In a state that a sub groove is entirely included in a tread ground contact area, the path length difference between a length of a path which runs through only the main groove from one end edge to the other end edge of a tread ground contact area in the circumferential direction of the tire and a length of a path which runs through the main groove and the sub groove is preferably ¼ to ¾ times, more preferably ½ times the length of the resonance noise frequency in the main groove as an air column. The phrase "a path which runs through only the main groove from one end edge to the other end edge of a tread ground contact area in the circumferential direction of the tire" as used herein means the imaginary line which connects lateral center points of the main groove in a tread ground contact area, and the length of the path namely corresponds to the extended length of the main groove in the tread ground contact area. Also, the phrase "a path which runs through the main groove and the sub groove" means that the path goes along the lateral center points of the main groove between one open end of the main groove which is open to the outside of a tread ground contact area and one of the ends of the sub groove which is closer to the open end of the main groove, goes along the lateral center points of the sub groove between the ends of the sub groove, and again goes along the lateral center points of the main groove between the other end of the sub groove and the other open end of the main groove.

The path length difference is preferably not less than 100 mm and not more than 250 mm, and more preferably not less than 140 mm and not more than 215 mm.

Moreover, the path length difference is preferably from 1 to 2 times the length of the path that runs through only the main groove, more preferably 1.1 to 1.8, further preferably 1.1 to 1.5, and further more preferably 1.3 to 1.5.

Preferably, the sub groove is branched, and the branched part terminates in a land portion, that is, the branched part is not open to another groove.

Also, at least one of the main groove and the sub groove is preferably provided with a convex part having a height not less than 1.6 mm at least one of the groove wall and the groove bottom thereof. The term "height" of a convex part means the maximum amount of the projection from a groove wall or a groove bottom.

In addition, the sub groove preferably has a groove width smaller than the groove width of the main groove. The "groove width" of a main groove means the average of the groove width of the main groove from one end edge to the other end edge of a tread ground contact area in the circumferential direction of the tire, while the "groove width" of a sub groove means the average of the groove width of the sub groove from one end edge to the other end edge of the sub groove which is included in the tread ground contact area.

Moreover, the sub groove preferably has a groove depth smaller than the groove depth of the main groove. The "groove depth" of a main groove means the average of the groove depth of the main groove from one end edge to the other end edge of tread ground contact area in the circumferential direction of the tire, while the "groove depth" of a sub groove means the average of the groove depth of the sub groove from one end edge to the other end edge of the sub groove which is included in the tread ground contact area.

According to the present invention, a sub groove functioning as an interference silencer is formed and connected to a main groove extending in the circumferential direction of the tire so as to effectively reduce air column resonance noise without reducing the volume of the main groove, and has high design flexibility in consideration of the entire property of the tire.

BRIEF DESCRIPTION OF THE DRAWINGS

FIG. 3(*b*) is a view showing a path B which runs through the main groove 2 and the sub groove 4 of the tire;

Figure 1:
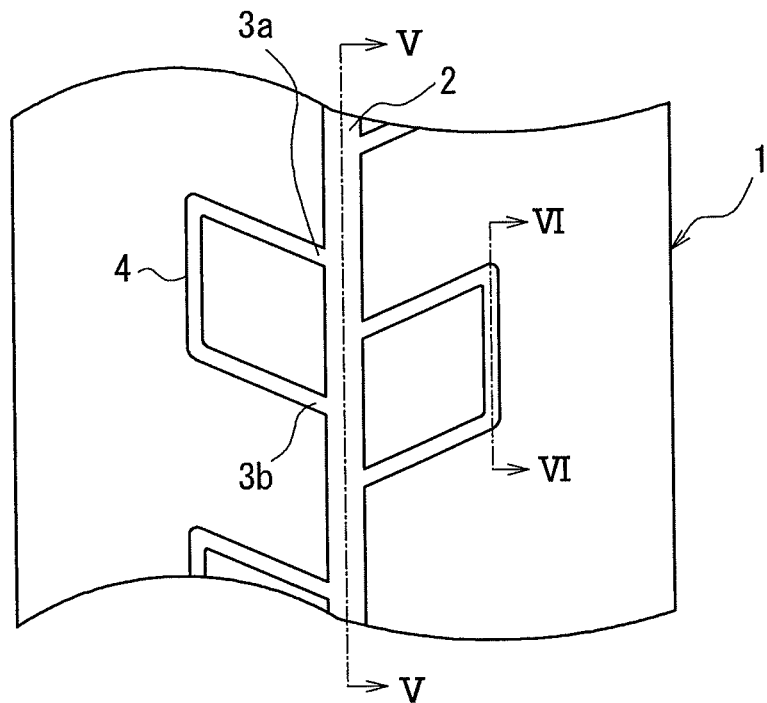
FIG. 1 is a developed view showing a part of a tread portion of a typical pneumatic tire according to the present invention.

DESCRIPTION OF SYMBOLS 1 tread surface
2 main groove
3*a*, 3*b* ends of sub groove
4 sub groove
5*a*, 5*b* end edges of tread ground contact area in the circumferential direction of the tire
6 branched part of sub groove
7 intersection of branched part
8 closed end of branched part
9 convex part of main groove
10 convex part of sub groove

BEST MODE FOR CARRYING OUT THE INVENTION

Next, with reference to the drawings, one embodiment of the present invention will be explained below. FIG. 1 a developed view showing a part of a tread portion of a typical pneumatic tire (hereinafter, referred to as a "tire") according to the present invention; and FIG. 2 is a view showing a footprint of the tread portion of FIG. 1.

The tire showing in FIG. 1 is provided with a tread surface 1 having a main groove 2 which continuously extends in the circumferential direction of the tire. The tire is also provided with a sub groove 4 which includes ends 3*a* and 3*b* open to the common main 2, and a portion between the ends deviously extending in a common land portion without being to open to anywhere. The numbers of the main groove 1 and the sub groove 4 may be appropriately varied in consideration of various properties required to the tire.

Figure 2:
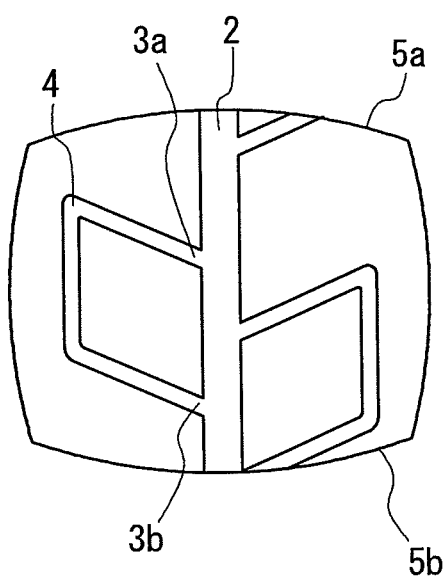
FIG. 2 is a view showing a footprint of the tread portion of FIG. 1.

In the present embodiment, when the tire is mounted to an applicable rim, filled with the maximum air pressure, and is applied with a load corresponding to 80% of a defined mass, the tread portion has a footprint as shown in FIG. 2. The sub groove 4 is configured to extend to be entirely included in a tread ground contact area, so that when the tire is rolling under load, there is a moment that the sub groove 4 is entirely included in the tread ground contact area with no portion located outside of the tread ground contact area, like the sub groove 4 on the left side of the main groove 2 in FIG. 2. As described above, air column resonance noise of a tire is produced by the resonance of air in the tube which is defined by a groove and road surface and is open to a leading end edge and a trailing end edge, and the phase of the resonance noise is determined by the length of the tube. In the present invention, the sub groove 4 is provided so that the resonance noise caused by the resonance in the tube which is constituted with a path through only the main groove 2, and the resonance noise caused by the resonance in the tube which is constituted with a path from a leading end edge of the main groove 2 to a trailing end edge of the main groove 2 via an open end of the sub groove 4, the entire sub groove 4, and the other opening end are produced. These resonance noises have different phrases from each other because they are caused by the tubes of different lengths, thereby, when overlapped, interfere with each other, which leads to a reduction of the sound pressure level. That is, the sub groove 4 functions as an interference silencer of air column resonance noise which is produced by the main groove 2, as the result of that the air column resonance noise can be effectively reduced without reducing the groove volume of the main groove.

Figure 3:
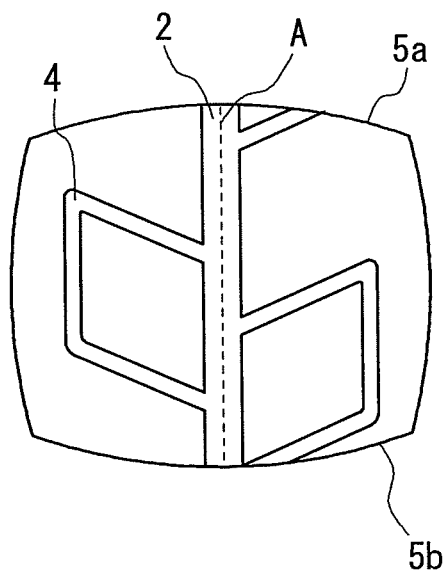
FIG. 3(*a*) is a view showing a path A which runs through only the main groove 2 from one end edge 5*a* to the other end edge 5*b* of a tread ground contact area in the circumferential direction of the tire which has the footprint of FIG. 2.
Figure 3:
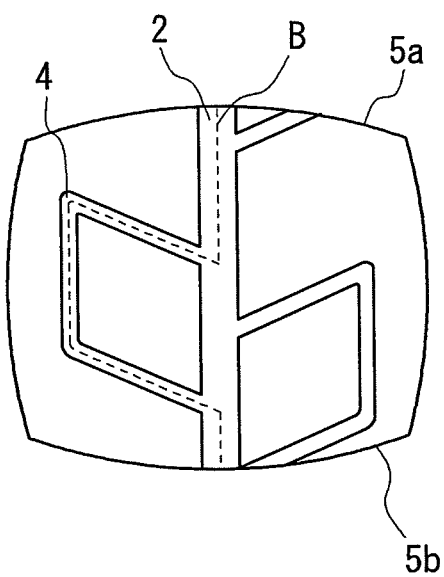

In order to cause the sub groove 4 to operate in a more effective manner as an interference silencer, the crest or trough of the sound wave of air column resonance noise which is produced in the path A (see FIG. 3(*a*)) running through only the main groove 2 from the one end edge 5*a* to the other end edge 5*b* of a tread ground contact area in the circumferential direction of the tire is preferably set to be overlapped with the trough or crest of the sound wave of air column resonance noise which is produced in the path B (see FIG. 3(*b*)) running through the main groove 2 and the sub groove 4. From the viewpoint of this, the path length difference $\Delta L=L2-L1$, which is the difference between the length L1 of the path A and the length L2 of the path B, is preferably ¼ to ¾ times, more preferably ⅓ to ⅔ times the length of the resonance noise frequency in the main groove as an air column. The above range of the path length difference makes the period of time of the overlapping between the crests and troughs and the troughs and crests of the sound waves, resulting in that the sound pressure level can be effectively reduced. Particularly, the path length difference $\Delta L$ is most preferably ½ times the length of the resonance noise frequency in the main groove as an air column, which makes the two sound waves in the totally opposite phases, and the sound pressure level can be most effectively reduced.

In designing the path length difference $\Delta L$, the wavelength of air column resonance noise to be cancelled has to be determined. Although the wavelength is influenced by ambient temperature, the influence is little. Thus, in the case of a general tire, the wavelength may be determined at ambient temperature of 20° C. (that is, at the sound velocity of 343.7 m/s). However, if the tire is used in a cold region or an environment at an extremely high temperature for example, it is preferred to compensate a sound velocity in consideration of the temperature.

The air column resonance noise to be cancelled preferably has a frequency within a range of from 700 to 1800 Hz. This is because human audition is, as shown by the A-weighting, especially sensitive to the band of the above range, and so the reduction of the sound pressure level of air column resonance noise within the frequency range enables the largest enhancement of silence of human feeling aspect. Particularly, it is effective to reduce the sound pressure level of air column resonance noise having a frequency within a range of from 800 to 1200 Hz. When this is expressed with a path length difference $\Delta L$, in order to obtain the interfere with the sound wave having air column resonance noise frequencies of from 700 to 1800 Hz at the sound velocity 343.7 m/s, the path length difference $\Delta L$ is preferably not less than 50 mm and not more than 375 mm which corresponds to ¼ to ¾ times the length of the air column resonance noise frequency, and more preferably not less than 65 mm and not more than 330 mm which corresponds to ⅓ to ⅔ times the length of the air column resonance noise frequency. Also, the path length difference $\Delta L$ is preferably from not less than 70 mm and not more than 320 mm which corresponds to ¼ to ¾ times the length of the resonance noise sound frequency of from 800 to 1200 Hz at the sound velocity 343.7 m/s, and more preferably not less than 90 mm and not more than 285 mm which corresponds to ⅓ to ⅔ times the length of the resonance noise sound frequency. Moreover, the path length difference $\Delta L$ is more preferably not less than 100 mm and not more than 250 mm which corresponds to one half times the length of the sound wave of resonance noise frequency of from 700 to 1800 Hz at the sound velocity 343.7 m/s, and the path length difference $\Delta L$ is most preferably not less than 140 mm and not more than 215 mm which corresponds to one half times the length of the sound wave of air column resonance noise frequency of from 800 to 1200 Hz at the sound velocity 343.7 m/s.

The air column which is formed with road surface and the main groove is an open tube which needs end correction of the opening. In order to restrain the air column resonance noise of the above frequency in a general tire in consideration of the end correction, the path length difference $\Delta L$ is preferably within a range of from 1 to 2 times, more preferably 1.1 to 1.8 times, further preferably 1.1 to 1.5 times, and further more preferably 1.3 to 1.5 times the length L1 of the path A. This allows the sub groove to effectively function as an interference silencer.

Figure 4:
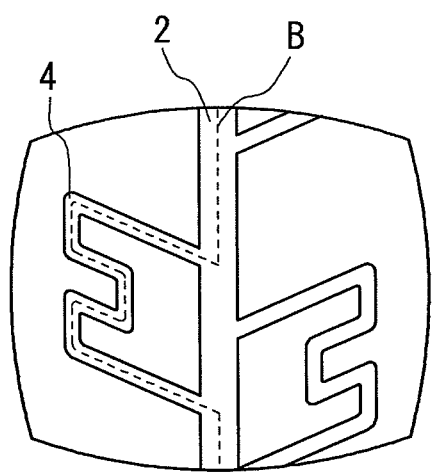
FIGS. 4(*a*) and (*b*) are respectively views showing the footprints of a tread portion of pneumatic tire according to another embodiment of the present invention.
Figure 4:
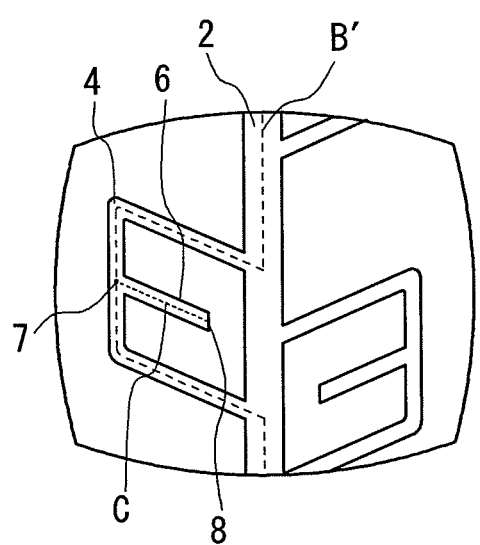

In the case where a larger path length difference $\Delta L$ is desired, as shown in FIG. 4(*a*), the sub groove 4 may have more turns, and as shown in FIG. 4(*b*), the sub groove 4 may have a branched part 6 which branches from the sub groove 4 and terminates in a land portion. This is possible because, as compared to the configuration of the sub groove 4, the path length difference $\Delta L$ contributes more to the silencing effect. For example, in the cases where the tread has a small area or the area in which the sub groove 4 can be arranged is limited due to the arrangement pattern of other grooves, the path length difference $\Delta L$ can be effectively secured by extending the sub groove in a manner as shown in FIG. 4(*a*) or FIG. 4(*b*). When the branched part 6 is provided, the path B of the sound wave entering the sub groove 4 goes along a path B' which is the same as in the case without the branched part 6, and enters the branched part 6 via the intersection 7 of the branched part 6, turns at a closed end 8 of the branched part 6 back to the intersection 7, and again goes along the path B'. Thus, the length L2 of the path B with such a branched part 6 is equal to the sum of the length L3 of the path B' and twice of the length L4 of the path C, that is L3+L4×2. In this way, in the tire of the present invention, the length of the path B can be extended by increasing the number of turns or forming a branched part, thereby the design flexibility of tread pattern is enhanced. The number of branched part 6 is not limited to one, but may be two or more. When a plurality of branched parts are formed, the path length difference can be increased by twice of the length of path C of the branched part as described above, whether the branched parts have a curved shape or a linear shape.

Figure 5:
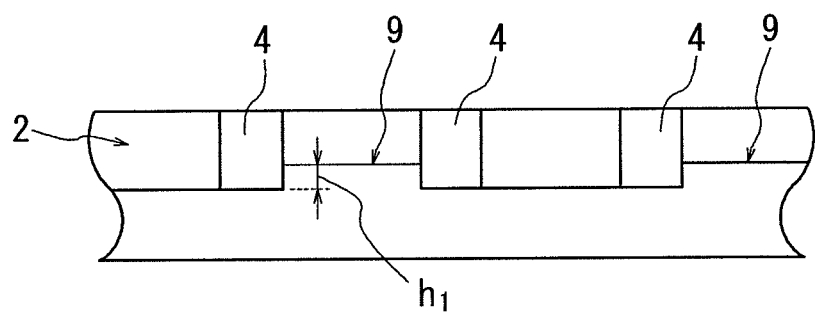
FIG. 5 is a sectional view taken along the line V-V of FIG. 1.

FIG. 5 is a sectional view taken along the line V-V of FIG. 1. As shown, the main groove 2 preferably has a convex part 9 having a height h1 of not less than 1.6 mm at least one of the groove wall and the groove bottom thereof, at the groove bottom in the shown embodiment. For, the convex part 9 provided in the main groove 2 enables the attenuation of the sound wave propagating in the main groove 2, and the reduction of sound pressure level of the air column resonance noise.

Figure 6:
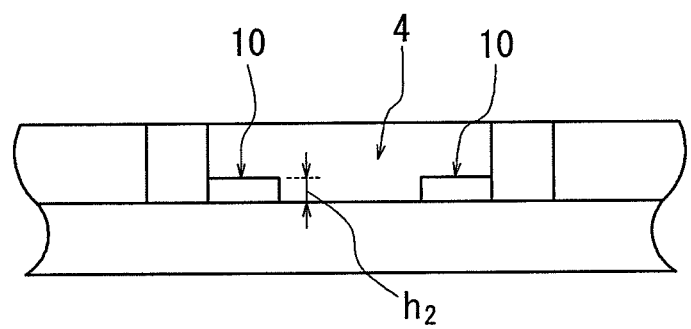
FIG. 6 is a sectional view taken along the line VI-VI of FIG. 1.

FIG. 6 is a sectional view taken along the line VI-VI of FIG. 1. As shown, the sub groove 4 preferably has a convex part 10 having a height h2 of not less than 1.6 mm at least one of the groove wall and the groove bottom thereof, at the groove bottom in the shown embodiment. In a tire having such a tread pattern, the phenomenon that rocks and the like on road are trapped in the groove, so-called stone trapping is likely to occur, and in order to prevent the phenomenon, conventionally, measures have been taken such as the increase of a groove width. The convex part 10 provided to the sub groove 4, however, enables the prevention of such stone trapping, which enhanced the design flexibility of tread pattern. In the case where the convex part 9 is provided in the main groove 2 also, the effect for preventing stone trapping can be expected. For an excellent effect for preventing stone trapping, the convex part preferably has a height of not less than 3.0 mm.

Moreover, as shown in FIGS. 1 to 4, the sub groove 4 preferably has a small groove width as compared to the groove width of the main groove 2. Also, the sub groove 4 preferably has a small groove depth as compared to the groove depth of the main groove 2 (not shown). Such a sub groove 4 configured according to the present invention enables an effective reduction of air column resonance noise. The sub groove 4, however, is a space having a certain volume, and is included in a tread portion periodically, which causes pitch noise. Then, the sub groove 4 having a groove width and a groove depth configured as described above has a small cross sectional area as compared to that of the main groove, that is, the sub groove 4 has a smaller volume, which enables the reduction of pitch noise while the function as the interference silencer being maintained.

The above description shows only a part of embodiments of the present invention, and any combination of the above configurations and various changes may be made to the embodiment without departing from the spirit of the present invention. For example, in the above explanation, there is formed only one circumferential groove extending along the circumferential direction in the embodiment, but two or more circumferential grooves may be formed, and the groove(s) may circumferentially extend in a devious manner.

EXAMPLE

Next, a trial model of the tire according to the present invention is made and performance evaluations were performed as follows.
(Experiment 1)

In Experiment 1, the influence of the presence/absence of a sub groove and the size of the path length difference $\Delta L$ onto silencing effect is examined. The tires used in Examples 1 to 17 were radial tires for passenger vehicle (size: 195/65R15), and had the specification shown in Table 1. The main groove had a width of 8 mm and a depth of 8 mm, while the sub groove had a width of 4 mm and a depth of 6 mm. Unless otherwise indicated, the main grooves and the sub grooves of the tires in the following experiments conform to the above configurations.

For comparison, a tire model of a conventional example 1 of the specifications shown in Table 1 is also manufactured, the model having the same tire size and the same main groove as those in Examples 1 to 17 but not having a sub groove.

Each test tire is mounted to a 6JJ rim to provide a tire wheel assembly, and the tire wheel assembly is applied with an air pressure of 210 kPa (relative pressure), and driven on a drum tester under the condition with a load applied to the tire of 4.47 kN and a driving speed of 80 km/h, so that the sound on both sides of the tire is measured according to the condition specified in JASO C606 to evaluate the silencing effect by the sub groove using partial overall values in a ⅓ octave band with center frequencies of 800-1000-1250 Hz. The evaluation results are shown in Table 1 and FIG. 7. The numeric values for silencing effect in the table represent the differences between the sound pressure level measured on both sides of the tire in Conventional Example 1 and that of each Example: a larger numeric value provides larger silencing effect, and for luxury cars and the like which require particularly extreme silence, a numeric value of 2 dB or more is necessary for a sufficient silencing effect.

TABLE 1

| | Path Length L1 (mm) | Path Length L2 (mm) | Path Length Difference $\Delta L$ (mm) | Extension Configuration of Sub Groove | Silencing Effect (dB) |
|---|---|---|---|---|---|
| Conventional Example 1 | 140 | — | — | — | 0 |
| Example 1 | 140 | 190 | 50 | FIG. 3 | 0.4 |
| Example 2 | 140 | 210 | 70 | FIG. 3 | 0.7 |
| Example 3 | 140 | 220 | 80 | FIG. 3 | 1.0 |
| Example 4 | 140 | 230 | 90 | FIG. 3 | 1.7 |
| Example 5 | 140 | 240 | 100 | FIG. 3 | 2.0 |
| Example 6 | 140 | 260 | 120 | FIG. 3 | 2.5 |
| Example 7 | 140 | 280 | 140 | FIG. 3 | 3.0 |
| Example 8 | 140 | 320 | 180 | FIG. 3 | 3.1 |
| Example 9 | 140 | 340 | 200 | FIG. 3 | 3.2 |
| Example 10 | 140 | 355 | 215 | FIG. 4(a) | 3.0 |
| Example 11 | 140 | 370 | 230 | FIG. 4(a) | 2.5 |
| Example 12 | 140 | 390 | 250 | FIG. 4(a) | 2.1 |
| Example 13 | 140 | 410 | 270 | FIG. 4(a) | 1.6 |
| Example 14 | 140 | 425 | 285 | FIG. 4(a) | 1.4 |
| Example 15 | 140 | 440 | 300 | FIG. 4(a) | 1.2 |
| Example 16 | 140 | 460 | 320 | FIG. 4(a) | 1.1 |
| Example 17 | 140 | 480 | 340 | FIG. 4(a) | 0.6 |

Figure 7:
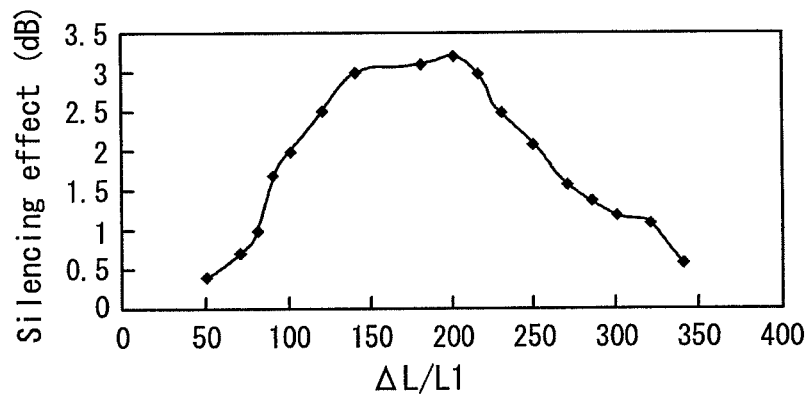
FIG. 7 is a graph showing the relationship between a path length difference ΔL and silencing effect in Experiment 1.

As clearly seen from the results shown in Table 1 and FIG. 7, the sub groove enables a larger reduction of air column resonance noise as compared to the tire of Conventional Example 1 without a sub groove. Particularly, in the case with a path length difference $\Delta L$ of not less than 70 mm and not more than 320 mm or less which corresponds to ¼ to ¾ times the length of the sound wave of air column resonance noise, the air column resonance noise can be reduced more, while in the case with a path length difference $\Delta L$ of not less than 90 mm and not more than 285 mm which corresponds to ⅓ to ⅔ times the length of the sound wave, the air column resonance noise can be further reduced, and in the case with a path length difference $\Delta L$ of not less than 100 mm and not more than 250 mm or less which corresponds to one half times the length of the sound wave of air column resonance noise, a further more reduction can be achieved.

(Experiment 2)

In Experiment 2, the relationship between the ratio of a path length difference ΔL of a sub groove to a path L1 which runs through only a main groove and the silencing effect is examined. The tires used in Examples 18 to 27 were radial tires for passenger vehicle (size: 195/65R15), and had the specification shown in Table 2.

For comparison, a tire model of a conventional example 2 of the specifications shown in Table 2 is also manufactured, the model having the same tire size and the same main groove as those in Examples 18 to 27 but not having a sub groove.

For each test tire, the silencing effect is evaluated as in the case of Experiment 1. The evaluation results are shown in Table 2 and FIG. 8. The numeric values for silencing effect in the table represent the differences between the sound pressure level measured on both sides of the tire in Conventional Example 2 and that of each Example: a larger numeric value provides larger silencing effect, and for luxury cars and the like which require particularly extreme silence, a numeric value of 2 dB or more is necessary for a sufficient silencing effect.

(Experiment 3)

In Experiment 3, the relationship between a path length difference ΔL with a sub groove which had a branched part and the silencing effect is examined. The tires used in Examples 28 to 38 were radial tires for passenger vehicle (size: 195/65R15), and had the specification shown in Table 3.

For comparison, a tire model of a conventional example 3 of the specifications shown in Table 3 is also manufactured, the model having the same tire size and the same main groove as those in Examples 28 to 38 but not having a sub groove.

For each test tire, the silencing effect is evaluated as in the case of Experiment 1. The evaluation results are shown in Table 3 and FIG. 9. The numeric values for silencing effect in the table represent the differences between the sound pressure level measured on both sides of the tire in Conventional Example 3 and that of each Example: a larger numeric value provides larger silencing effect, and for luxury cars and the like which require particularly extreme silence, a numeric value of 2 dB or more is necessary for a sufficient silencing effect.

TABLE 3

|  | Path Length L1 (mm) | Path Length L2 (mm) | Branched Part Length L4 (mm) | Path Length Difference ΔL (mm) | Extension Configuration of Sub Groove | Silencing Effect (dB) |
| --- | --- | --- | --- | --- | --- | --- |
| Conventional Example 3 | 140 | — | — | — | — | 0 |
| Example 28 | 140 | 180 | 5 | 50 | FIG. 4(b) | 0.4 |
| Example 29 | 140 | 190 | 15 | 80 | FIG. 4(b) | 1.0 |
| Example 30 | 140 | 200 | 20 | 100 | FIG. 4(b) | 2.2 |
| Example 31 | 140 | 200 | 30 | 120 | FIG. 4(b) | 2.7 |
| Example 32 | 140 | 210 | 35 | 140 | FIG. 4(b) | 3.2 |
| Example 33 | 140 | 250 | 35 | 180 | FIG. 4(b) | 3.3 |
| Example 34 | 140 | 250 | 45 | 200 | FIG. 4(b) | 3.3 |
| Example 35 | 140 | 265 | 45 | 215 | FIG. 4(b) | 3.1 |
| Example 36 | 140 | 270 | 50 | 230 | FIG. 4(b) | 2.6 |
| Example 37 | 140 | 290 | 50 | 250 | FIG. 4(b) | 2.3 |
| Example 38 | 140 | 310 | 50 | 270 | FIG. 4(b) | 1.8 |

TABLE 2

|  | Path Length L1 (mm) | Path Length L2 (mm) | ΔL/L1 | Extension Configuration of Sub Groove | Silencing Effect (dB) |
| --- | --- | --- | --- | --- | --- |
| Conventional Example 2 | 140 | — | — | — | 0 |
| Example 18 | 140 | 240 | 0.7 | FIG. 3 | 1.8 |
| Example 19 | 140 | 280 | 1 | FIG. 3 | 2.8 |
| Example 20 | 140 | 294 | 1.1 | FIG. 3 | 3.1 |
| Example 21 | 140 | 308 | 1.2 | FIG. 3 | 3.1 |
| Example 22 | 140 | 322 | 1.3 | FIG. 3 | 3.2 |
| Example 23 | 140 | 350 | 1.5 | FIG. 4(a) | 3.2 |
| Example 24 | 140 | 392 | 1.8 | FIG. 4(a) | 2.5 |
| Example 25 | 140 | 406 | 1.9 | FIG. 4(a) | 2.0 |
| Example 26 | 140 | 420 | 2 | FIG. 4(a) | 1.2 |
| Example 27 | 140 | 462 | 2.3 | FIG. 4(a) | 0.8 |

Figure 8:
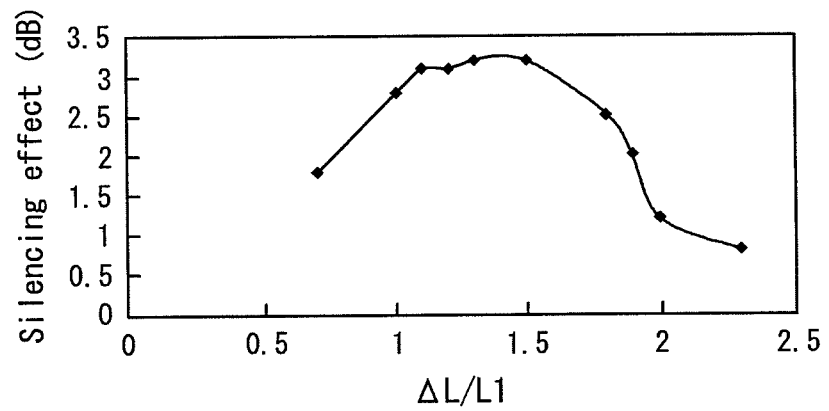
FIG. 8 is a graph the relationship between a ratio of a path length difference ΔL to a path L1 and silencing effect in Experiment 2.

As clearly seen from the results shown in Table 2 and FIG. 8, it is understood that the air column resonance noise can be significantly reduced in the case where the path length difference ΔL is 1 to 2 times the length of the path L1 which passes through only a main groove, a more reduction can be achieved with the difference being 1.1 to 1.8 times, a further reduction with the difference being 1.1 to 1.5 times, and a further more reduction with the difference being 1.3 to 1.5 times.

Figure 9:
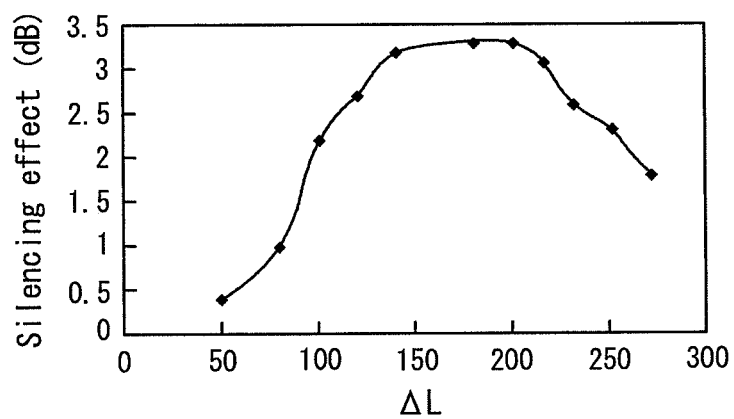
FIG. 9 is a graph the relationship between a path length difference ΔL and silencing effect in Experiment 3.

As clearly seen from the results shown in Table 3 and FIG. 9, as in the case of Experiment 1, it is understood that the air column resonance noise can be considerably reduced particularly in the case with the path length difference ΔL of not less than 100 mm and not more than 250 mm.

(Experiment 4)

In Experiment 4, the relationship between the ratio of a path length difference ΔL of a sub groove having a branched part to a path L1 which runs through only a main groove and the silencing effect is examined. The tires used in Examples 39 to 47 were radial tires for passenger vehicle (size: 195/65R15), and had the specification shown in Table 4.

For comparison, a tire model of a conventional example 4 of the specifications shown in Table 4 is also manufactured, the model having the same tire size and the same main groove as those in Examples 39 to 47 but not having a sub groove.

For each test tire, the silencing effect is evaluated as in the case of Experiment 1. The evaluation results are shown in Table 4 and FIG. 10. The numeric values for silencing effect in the table represent the differences between the sound pressure level measured on both sides of the tire in Conventional Example 4 and that of each Example: a larger numeric value provides larger silencing effect, and for luxury cars and the like which require particularly extreme silence, a numeric value of 2 dB or more is necessary for a sufficient silencing effect.

TABLE 4

|  | Path Length L1 (mm) | Path Length L2 (mm) | Branched Part Length L4 (mm) | ΔL/L1 | Extension Configuration of Sub Groove | Silencing Effect (dB) |
|---|---|---|---|---|---|---|
| Conventional Example 4 | 140 | — | — | — | — | 0 |
| Example 39 | 140 | 200 | 26 | 0.8 | FIG. 4(b) | 1.7 |
| Example 40 | 140 | 200 | 40 | 1 | FIG. 4(b) | 2.6 |
| Example 41 | 140 | 200 | 47 | 1.1 | FIG. 4(b) | 3.0 |
| Example 42 | 140 | 200 | 54 | 1.2 | FIG. 4(b) | 3.0 |
| Example 43 | 140 | 200 | 61 | 1.3 | FIG. 4(b) | 3.2 |
| Example 44 | 140 | 200 | 75 | 1.5 | FIG. 4(b) | 3.3 |
| Example 45 | 140 | 200 | 71 | 1.8 | FIG. 4(b) | 2.3 |
| Example 46 | 140 | 250 | 85 | 2 | FIG. 4(b) | 1.3 |
| Example 47 | 140 | 300 | 81 | 2.3 | FIG. 4(b) | 1.0 |

Figure 10:
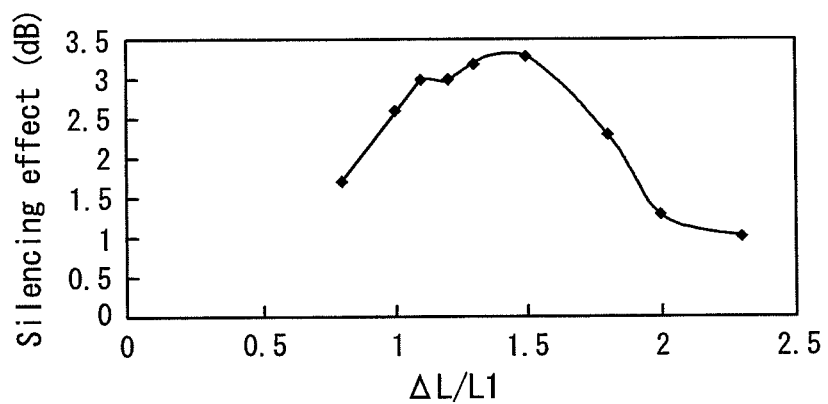
FIG. 10 is a graph the relationship between a ratio of a path length difference ΔL to a path L1 and silencing effect in Experiment 4.

As clearly seen from the results shown in Table 4 and FIG. 10, as in the case of Experiment 2, the air column resonance noise can be further reduced particularly in the case where the path length difference ΔL is 1.1 to 1.8 times the length of the path L1 which passes through only a main groove, a more reduction can be achieved with the difference being 1.1 to 1.5 times, and a further more reduction can be achieved with the difference being 1.3 to 1.5 times.

(Experiment 5)

In Experiment 5, the silencing effect in the case where a main groove is provided with a convex part is examined. The tires used in Examples 48 to 52 were radial tires for passenger vehicle (size: 195/65R15), and had the specification shown in Table 5. In Example 48, the tire had a main groove having a constant groove depth, while in Example 49 to 52, the tires basically had the same main groove as that of Example 48 except that the main groove had a convex part at a part of the groove bottom thereof.

For comparison, a tire model of a conventional example 5 of the specifications shown in Table 5 is also manufactured, the model having the same tire size and the same main groove as those in Examples 48 to 52 but not having a sub groove.

For each test tire, the silencing effect is evaluated as in the case of Experiment 1. The evaluation results are shown in Table 5. The numeric values for silencing effect in the table represent the differences between the sound pressure level measured on both sides of the tire in Conventional Example 5 and that of each Example: a larger numeric value provides larger silencing effect, and for luxury cars and the like which require particularly extreme silence, a numeric value of 2 dB or more is necessary for a sufficient silencing effect.

TABLE 5

|  | Path Length L1 (mm) | Path Length L2 (mm) | Height of Convex Part (mm) | Extension Configuration of Sub Groove | Silencing Effect (dB) |
|---|---|---|---|---|---|
| Conventional Example 5 | 140 | — | — | — | 0 |
| Example 48 | 140 | 310 | — | FIG. 3 | 2.8 |
| Example 49 | 140 | 310 | 1.0 | FIG. 3 | 2.8 |
| Example 50 | 140 | 310 | 1.6 | FIG. 3 | 3.2 |
| Example 51 | 140 | 310 | 3.0 | FIG. 3 | 3.3 |
| Example 52 | 140 | 310 | 4.0 | FIG. 3 | 3.4 |

As clearly seen from the results shown in Table 5, it is understood that the air column resonance noise can be considerably reduced particularly in the case where a convex part having a height of 1.6 mm or more is provided.

(Experiment 6)

In Experiment 6, the silencing effect and the effect for preventing stone trapping in the case where a sub groove is provided with a convex part were examined. The tires used in Examples 53 to 57 were radial tires for passenger vehicle (size: 195/65R15), and had the specification shown in Table 6. In Example 53, the tire had a main groove having a constant groove depth, while in Example 54 to 57, the tires basically had the same sub groove as that of Example 53 except that the sub groove had a convex part at a part of the groove bottom thereof.

For comparison, a tire model of a conventional example 6 of the specifications shown in Table 6 is also manufactured, the model having the same tire size and the same main groove as those in Examples 53 to 57 but not having a sub groove.

For each test tire, the silencing effect is evaluated as in the case of Experiment 1. The evaluation results are shown in Table 6. The numeric values for silencing effect in the table represent the differences between the sound pressure level measured on both sides of the tire in Conventional Example 6 and that of each Example: a larger numeric value provides larger silencing effect, and for luxury cars and the like which require particularly extreme silence, a numeric value of 2 dB or more is necessary for a sufficient silencing effect.

In addition, each test tire is mounted to a 6JJ rim to provide a tire wheel assembly, and the tire wheel assembly is installed to a test vehicle for a driving on an unpaved test course of 5 km under the condition with an air pressure of 210 kPa (relative pressure) and a load applied to the tire of 4.47 kN, so that the amounts of stone trapping to the sub grooves were visually and relatively evaluated. The results are shown in Table 6.

TABLE 6

|  | Path Length L1 (mm) | Path Length L2 (mm) | Height of Convex Part (mm) | Extension Configuration of Sub Groove | Silencing Effect (dB) | Stone Trapping |
|---|---|---|---|---|---|---|
| Conventional Example 6 | 140 | — | — | — | 0 | — |
| Example 53 | 140 | 310 | — | FIG. 3 | 3.0 | Large |
| Example 54 | 140 | 310 | 1.0 | FIG. 3 | 3.0 | Large |
| Example 55 | 140 | 310 | 1.6 | FIG. 3 | 2.9 | Less |
| Example 56 | 140 | 310 | 3.0 | FIG. 3 | 2.9 | None |
| Example 57 | 140 | 310 | 4.0 | FIG. 3 | 2.8 | None |

As clearly seen from the results shown in Table 6, it is understood that the convex part in a sub groove enables the prevention of stone trapping without any significant influences onto the silencing effect, and the effect for preventing stone trapping is markedly enhanced in the case with a convex part having a height of 1.6 mm or more.

(Experiment 7)

In Experiment 7, the reduction effect of pitch noise in the case where a sub groove had a groove width and a groove depth smaller than those of a main groove is examined. The tires used in Examples 58 to 61 were radial tires for passenger vehicle (size: 195/65R15), and had the specification shown in Table 7. In Example 58, the tire had a sub groove having the same groove width and the groove depth as those of the main groove, while in Example 59 to 61, the tires basically had the same sub groove as that of Example 58 except that the sub groove had a groove width and a groove depth, at least one of which is formed to be smaller than that of the main groove thereof.

For comparison, a tire model of a conventional example 7 of the specifications shown in Table 7 is also manufactured, the model having the same tire size and the same main groove as those in Examples 58 to 61 but not having a sub groove.

For each test tire, as in the case of Experiment 1, the silencing effect is evaluated, and in the experiment, the sound pressure in a pitch primary band is also measured to evaluate the effect of reduction of pitch noise. The evaluation results are shown in Table 7. The numeric values for silencing effect and the effect of reduction of pitch noise in the table represent the differences between the sound pressure level measured on both sides of the tire in Conventional Example 7 and that of each Example: a larger numeric value provides larger silencing effect. The differences ΔW in Table 7 are the values obtained by subtracting the groove width of a sub groove from the groove width of a main groove, and the differences ΔD are the values obtained by subtracting the groove depth of a sub groove from the groove depth of a main groove.

TABLE 7

| | Path Length L1 (mm) | Path Length L2 (mm) | ΔW (mm) | ΔD (mm) | Extension Configuration of Sub Groove | Silencing Effect (dB) | Silencing Effect of Pitch Noise (dB) |
|---|---|---|---|---|---|---|---|
| Conventional Example 7 | 140 | — | — | — | — | 0 | — |
| Example 58 | 140 | 310 | 0 | 0 | FIG. 3 | 3.1 | 0 |
| Example 59 | 140 | 310 | 0 | 3 | FIG. 3 | 2.9 | 1.5 |
| Example 60 | 140 | 310 | 3 | 0 | FIG. 3 | 2.9 | 2.0 |
| Example 61 | 140 | 310 | 2 | 2 | FIG. 3 | 2.7 | 2.3 |

As clearly seen from the results shown in Table 7, it is understood that the sub groove having a groove width and a groove depth, at least one of which is smaller than that of a main groove, enables a reduction of pitch noise without causing adverse influence on the silencing effect, and particularly in the case with both of the groove width and the groove depth of the sub groove are small as compared to those of the main groove, the effect of reduction of pitch noise is large.

In the above Examples, each of the sub grooves extended in the manner shown in FIG. 3, FIG. 4(a), or FIG. 4(b), but as seen from the comparison between the results of Experiment 1 and Experiment 3, as long as the path length differences are the same, the results showed that the silencing effect is generally the same even when the sub grooves extend in different manners from each other, or in any other manners.

INDUSTRIAL APPLICABILITY

As clearly seen from the above explanation, the present invention enables a pneumatic tire to be provided, which effectively reduces air column resonance noise without reducing the volume of the main groove thereof which extends in the circumferential direction of the tire, and has a high design flexibility in consideration of the entire property of the tire.

The invention claimed is:

1. A pneumatic tire provided on a tread surface with at least one main groove and at least one sub groove, the at least one main groove extending in the circumferential direction of the tire without a communication with grooves other than the at least one sub groove which open to the outside of a tread ground contact area, and the at least one sub groove having two ends open to the common main groove and the portion between the ends deviously extending in a common land portion, wherein the sub groove is configured to extend to be entirely included in a ground contact area of the tread when the tire mounted to an applicable rim is inflated with the maximum air pressure and is postured to be applied by a load corresponding to 80% of a defined mass, wherein in a state that the sub groove is entirely included in a tread ground contact area, a path length difference between a length of a path which runs through only the main groove from one end edge to the other end edge of the tread ground contact area in the circumferential direction of the tire and a length of a path which runs through the main groove and the sub groove is ¼ to ¾ times the length of the resonance noise frequency in the main groove as an air column, wherein the width of the at least one sub groove is substantially constant, wherein in a state that the sub groove is entirely included in a tread ground contact area, a path length difference between a length of a path which runs through only the main groove from one end edge to the other end edge of the tread ground contact area in the circumferential direction of the tire and a length of a path which runs through the main groove and the sub groove is 1 to 2 times the length of the path which passes through only the main groove from one end edge to the other end edge of the tread ground contact area in the circumferential direction of the tire, and wherein one of the at least one main groove is arranged at an equator of the tire, and the at least one sub groove extends from the main groove arranged at the equator, wherein the sub groove has more than two turns.

2. The pneumatic tire according to claim 1 wherein the path length difference is one half times of the wavelength of resonance noise sound in the main groove as an air column.

3. The pneumatic tire according to claim 1, wherein in a state that the sub groove is entirely included in a tread ground contact area, a path length difference between a length of a path which runs through only the main groove from one end edge to the other end edge of the tread ground contact area in the circumferential direction of the tire and a length of a path which passes through the main groove and the sub groove is not less than 100 mm and not more than 250 mm.

4. The pneumatic tire according to claim 1, wherein the sub groove has a branched part which branches therefrom to be terminated in a land portion.

5. The pneumatic tire according to claim 1, wherein the main groove has a groove wall and a groove bottom, at least one of which is provided with a convex part having a height of 1.6 mm or more.

6. The pneumatic tire according to claim 1, wherein the sub groove has a groove wall and a groove bottom, at least one of which is provided with a convex part having a height of not less than 1.6 mm.

7. The pneumatic tire according to claim 1, wherein the sub groove has a smaller groove width than that of the main groove.

8. The pneumatic tire according to claim 1, wherein the sub groove has a smaller groove depth than that of the main groove.

9. The pneumatic tire according to claim 1, wherein depths of the two ends of the at least one sub groove are substantially the same as the depth of the at least one main groove adjacent the two ends.

10. The pneumatic tire according to claim 1, wherein first sub grooves extending from the main groove in a widthwise first direction and second sub grooves extending from the main groove in a widthwise second direction opposite to the widthwise first direction are arranged alternately in the circumferential direction, and the first and second sub grooves have the path length difference set forth in claim 1.

\* \* \* \* \*